US009645256B2

(12) United States Patent
Kahilainen

(10) Patent No.: US 9,645,256 B2
(45) Date of Patent: May 9, 2017

(54) RADIATION DETECTOR AND METHOD

(71) Applicant: MIRION TECHNOLOGIES, INC., San Ramon, CA (US)

(72) Inventor: Jukka Kahilainen, Discovery Bay, CA (US)

(73) Assignee: Mirion Technologies Inc., San Ramon, CA (US)

(*) Notice: Subject to any disclaimer, the term of this patent is extended or adjusted under 35 U.S.C. 154(b) by 0 days.

(21) Appl. No.: 14/773,711

(22) PCT Filed: Feb. 27, 2014

(86) PCT No.: PCT/US2014/019153
§ 371 (c)(1),
(2) Date: Sep. 8, 2015

(87) PCT Pub. No.: WO2014/163946
PCT Pub. Date: Oct. 9, 2014

(65) Prior Publication Data
US 2016/0041271 A1    Feb. 11, 2016

Related U.S. Application Data

(60) Provisional application No. 61/778,203, filed on Mar. 12, 2013.

(51) Int. Cl.
*G01T 1/185* (2006.01)
(52) U.S. Cl.
CPC .................. *G01T 1/185* (2013.01)

(58) Field of Classification Search
CPC ....................................................... G01T 1/185
See application file for complete search history.

(56) References Cited

U.S. PATENT DOCUMENTS

| | | | | |
|---|---|---|---|---|
| 3,869,613 A | * | 3/1975 | Link | G01N 21/3518 250/343 |
| 4,227,086 A | | 10/1980 | Dreyfus | |
| 5,245,406 A | * | 9/1993 | Masutani | G01J 3/453 250/339.08 |
| 5,298,755 A | * | 3/1994 | Wuest | H05H 1/0031 250/374 |

(Continued)

OTHER PUBLICATIONS

International Search Report mailed on Jun. 18, 2014 for International Application No. PCT/US2014/019153.
(Continued)

*Primary Examiner* — Marcus Taningco
(74) *Attorney, Agent, or Firm* — Ladas & Parry, LLP

(57) ABSTRACT

Disclosed is a radiation detector, comprising a chamber or cavity that produces charge carriers when radiation is incident thereon. The chamber is defined in part by a deformable plate along one side of the chamber or cavity; and a rigid plate spaced and electrically insulated from the deformable plate. A charging voltage source is present for applying a voltage to the deformable plate; such that wherein the deformable plate is attracted toward the rigid plate by electrostatic forces when charged by the charging voltage source, and moves away from the rigid plate when charge carriers produced in the chamber or cavity by incident radiation reduce the electrostatic forces between the deformable and rigid plates.

35 Claims, 2 Drawing Sheets

(56) References Cited

U.S. PATENT DOCUMENTS

| | | | |
|---|---|---|---|
| 5,835,255 A | 11/1998 | Miles | |
| 6,040,937 A | 3/2000 | Miles | |
| 6,982,820 B2 | 1/2006 | Tsai | 359/290 |
| 7,369,296 B2 * | 5/2008 | Floyd | G02B 26/001 |
| | | | 359/223.1 |
| 7,995,265 B2 | 8/2011 | Chui | |
| 8,168,120 B1 * | 5/2012 | Younis | G01N 29/022 |
| | | | 422/68.1 |
| 2009/0135463 A1 | 5/2009 | Miles | 359/290 |
| 2009/0244543 A1 | 10/2009 | Webster | |
| 2011/0075245 A1 | 3/2011 | Hashimura et al. | 359/291 |
| 2011/0317245 A1 * | 12/2011 | Sampsell | G01J 3/26 |
| | | | 359/290 |
| 2012/0182595 A1 | 7/2012 | Miles | 359/290 |
| 2013/0135189 A1 * | 5/2013 | Yin | G06F 3/0421 |
| | | | 345/156 |

OTHER PUBLICATIONS

International Preliminary Report on Patentability Chapter II mailed on Jun. 30, 2015 for PCT application No. PCT/US2014/019153.
European Supplementary Search Report & Opinion issued Oct. 7, 2016 with respect to EPO patent application No. 14778888.9.

* cited by examiner

RADIATION DETECTOR AND METHOD

CROSS-REFERENCE TO RELATED APPLICATION

This application is the U.S. National Stage of International Patent Application No. PCT/US2014/019153 filed on Feb. 27, 2014, which is related to and claims priority to U.S. Provisional Patent Application Ser. No. 61/778,203 filed Mar. 12, 2013, which is hereby incorporated by reference in its entirety.

BACKGROUND

1. Field

The present technology pertains generally to radiation detectors, and more particularly to self indicating or direct reading radiation detectors, and most particularly to radiation detectors with a direct optical visual readout.

2. Description of Related Art

There is a need to monitor exposure to radiation in a variety of work environments, from nuclear reactors to hospitals and other medical facilities. In today's world, there is also the danger of terrorist threats using nuclear material, so military personnel and first responders need to be able to monitor their environments for these materials.

A wide variety of radiation detectors are available. Some are complex and permanently installed in a facility such as a nuclear reactor. Others, such as personal dosimeters, are worn by individuals. Ideally a personal dosimeter will give an immediate indication of the presence of radiation.

Self indicating or direct reading personal dosimeters include electronic personal dosimeters (EPD), quartz fiber dosimeters (QFD), and radiochromic dosimeters (RCD). However, these types of dosimeters have a number of drawbacks. Electronic dosimeters are expensive and require a battery to operate. Quartz fiber dosimeters are difficult to read and have a limited measuring range. Radiochromic dosimeters are not capable of measuring low doses of radiation and are sensitive to ambient UV radiation, temperature, and humidity, and cannot be reused.

Accordingly it is desirable to provide an improved self indicating or direct reading radiation detector and method.

BRIEF SUMMARY

This writing pertains to a radiation detector with a deformable cavity or chamber. More specifically, an aspect of the present technology is a radiation detector, including a conductive plate having a semireflective surface; a conductive plate having a mirrored surface; one of the plates being flexible and the other being rigid; electrically insulating supports separating the flexible and rigid conducting plates, the plates and supports defining and enclosing a chamber therebetween; a switch; a charging voltage source connected across the plates by the switch; wherein the flexible plate is attracted toward the rigid plate by an electrostatic force produced between the plates when the charging voltage source is connected across the plates, and charge carriers produced in the chamber by incident radiation are attracted to the plates and change the electrostatic force between the plates so that the flexible plate moves relative to the rigid plate, and ambient light reflected from the flexible and rigid plates interferes and produces observable color changes as the flexible plate moves relative to the rigid plate.

Another aspect is a radiation detector, including a chamber or cavity that produces charge carriers when radiation is incident thereon; a deformable plate along one side of the chamber or cavity; a rigid plate spaced and electrically insulated from the deformable plate; a charging voltage source for applying a voltage to the deformable plate; wherein the deformable plate is attracted toward the rigid plate by electrostatic forces when charged by the charging voltage source, and moves away from the rigid plate when charge carriers produced in the chamber or cavity by incident radiation reduce the electrostatic forces between the deformable and rigid plates.

A further aspect is a method of detecting radiation, by providing a chamber or cavity that produces charge carriers when radiation is incident thereon; providing a deformable plate along one side of the chamber or cavity; providing a rigid plate spaced and electrically insulated from the deformable plate; applying a voltage to the deformable plate; wherein the deformable plate is attracted toward the rigid plate by electrostatic forces when charged by the applied voltage, and moves away from the rigid plate when charge carriers produced in the chamber or cavity by incident radiation reduce the electrostatic forces between the deformable and rigid plates.

Further aspects will be brought out in the following portions of the specification, wherein the detailed description is for the purpose of fully disclosing preferred embodiments of the invention without placing limitations thereon.

BRIEF DESCRIPTION OF THE DRAWINGS

The technology will be more fully understood by reference to the following drawings which are for illustrative purposes only.

DETAILED DESCRIPTION

Referring more specifically to the drawings, for illustrative purposes the present technology is embodied in the apparatus generally shown in FIG. 1 through FIG. 6. It will be appreciated that the apparatus may vary as to configuration and as to details of the parts, and the method may vary as to specific sequence of steps, without departing from the basic concepts as disclosed herein.

The technology is an apparatus and method for detecting radiation in which a microelectromechanical structure (MEMS) is used to provide the readout. In one embodiment the radiation detector is configured as an interferometric modulator in which visually observed change in color indicates exposure. In a basic embodiment, the structure has two electrically conductive plates electrically insulated and separated from each other by a micromechanical spring, and the space between the plates is filled with gas. The plates are charged to different electric potentials, creating an electrostatic force between the plates, which pulls one plate closer to the other. Ionizing radiation interacts with the gas, producing electric charges, which change the electric potential on the plates, which causes a change in the electrostatic force and the distance between the plates. This change in distance between the plates can be detected optically as a result of interferometric effects. An incident light beam on the two plates is reflected and constructively or destructively interferes, depending on the plate separation. This constructive or destructive interference results in an easily observable change in color of the reflected light. To detect non-ionizing radiation, a photoemitter material is placed on one of the plates. In an alternate embodiment, the two plate structure is adjacent a much larger cavity in which the radiation produces charge carriers. Again, the charge carriers produced by the radiation, either by interacting with a gas or with a photoemissive material, change the charge on the plates, thereby changing the plate separation, and allowing a visual or other readout.

Figure 1:
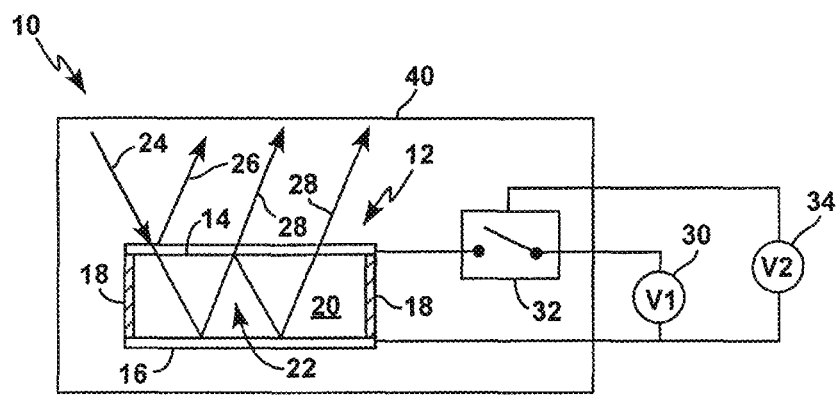
FIG. 1 is a cross-sectional view of an interferometric modulator radiation detector of the invention in a first (open) state.

FIG. 1 shows an interferometric modulator radiation detector 10 of the invention. The detector 10 is based on a microelectromechanical structure 12 formed of two spaced conductive plates 14, 16 separated by electrically insulating supports 18. The plates 14, 16 and supports 18 define and enclose a chamber or cavity 20 which is filled with a gas 22. Top plate 14 is a flexible conductive plate with a semireflective surface. Bottom plate 16 is a rigid conductive plate with a mirrored surface. An incident light beam 24 will be partly reflected from plate 14 as beam 26 and partly transmitted therethrough to plate 16 where it will be reflected as beam 28. Beam 28 may be produced by multiple reflections from plate 16 as shown (by back reflections from the bottom of plate 14), depending on the size of structure 12 and the angle of incidence of beam 24. Beams 26 and 28 may constructively or destructively interfere, depending on the spacing between plates 14, 16. Incident light beam 24 is just ambient light, e.g. sunlight or interior lighting. Structure 12 is basically a Fabry-Perot interferometer or etalon where light beams reflected from two surfaces interfere. Top plate 14 may be formed of or include an optical thin film stack on its bottom surface to optically enhance the properties of the interferometer, e.g. by controlling reflectivity of particular wavelengths.

As shown in FIG. 1, a charging voltage source 30 is connected across plates 14, 16 through a micromechanical or other switch 32. Switch 32 is controlled by a switch control voltage source 34. As shown in FIG. 1, switch 32 is open, so no voltage is applied to plates 14, 16. Thus structure 12 is in a first or open state.

Figure 2:
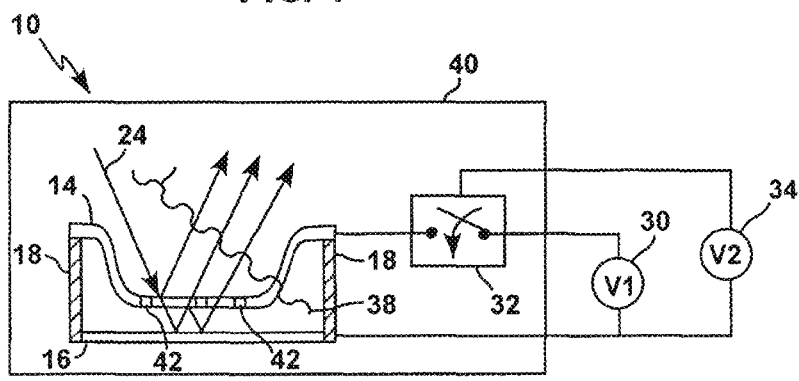
FIG. 2 is a cross-sectional view of the interferometric modulator radiation detector of FIG. 1 in a second (closed) state.
Figure 3A:
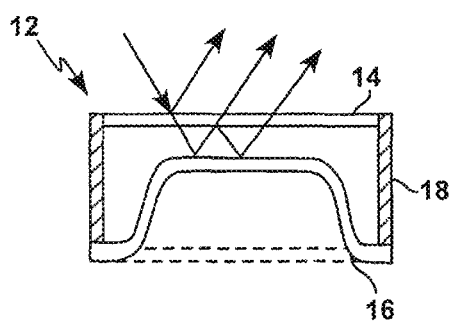
FIGS. 3A, B are cross-sectional views of alternate embodiments of the MEMS structure of the radiation detector of FIGS. 1-2.

FIG. 2 shows the radiation detector 10 of the invention with switch 32 closed by applying a voltage from switch control voltage source 34. Switch control voltage source 34 applies a sequence of very short pulses to switch 32 so that switch 32 is closed for only a short time, and then opens. The voltage from charging voltage source 30 has now been applied across the plates 14, 16, creating an electrostatic force between the plates 14, 16. Since plate 14 is flexible, it is pulled down toward plate 16, thereby changing the distance between plates 14, 16. Since the path length between the reflected beams 26, 28 from plates 14, 16 respectively has changed, the interference effects have also changed, which can be observed directly as a change in the color of the reflected light. The electrostatic force pulls plate 14 against the spring force provided by the flexible material, to a position where the forces are balanced. Structure 12 is now in a second or closed state. While FIGS. 1-2 show partly reflective top plate 14 as flexible and reflective bottom plate 16 as rigid, the partly reflective top plate 14 may be rigid and the reflective bottom plate 16 may be flexible, as shown in FIG. 3A. In FIG. 3A MEMS structure 12 is shown in the second or closed state with bottom plate 16 attracted towards top plate 14; the first or open state of plate 16 is shown by the dashed lines.

As also shown in FIG. 2, incident radiation 36 interacts with the gas 22 in chamber 20 and produces charge carriers 38 which are attracted to the plates 14, 16. The resultant change in charge on plates 14, 16 changes the electrostatic force between plates 14, 16, allowing plate 14 to move to a different position, e.g. back from the second or closed state to the first or open state. This again changes the spacing between the plates so the interference effects change. The resultant color change is an indicator of the presence of radiation. The next voltage source pulse then fully charges the plates again so they return back to the second or closed state again, and the operation repeats as more radiation is incident thereon.

The basic structure 12 is similar in some respects to the interferometric modulator (imod) invented by Mark W. Miles, e.g. see U.S. Pat. Nos. 5,835,255; 6,040,937; and 7,995,265. The imods disclosed therein form pixels for electronic display devices, creating various colors by interference of reflected light by electronically addressing the individual imods and changing the voltages thereto to control the colors of each pixel to form the desired image.

Various gases, including air, at various pressures may be used in the detector 10. However, as plate 14 is attracted to plate 16, the chamber volume decreases and the gas pressure increases, increasing the spring force on plate 14. To avoid this interference, structure 12 may be enclosed in a hermetic enclosure or housing 40 and plate 14 may contain perforations or small apertures 42 therein. The chamber 20 and enclosure 40 may then be filled with gas 22 and constant pressure in chamber 20 may be maintained as plate 14 moves closer or farther from plate 16.

Figure 3B:
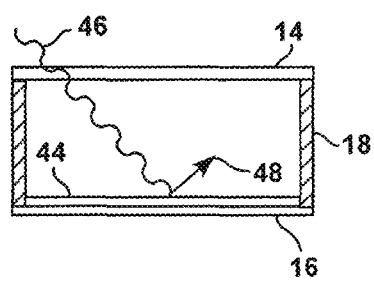

While a particular application of the detector of the invention is to detect harmful ionizing radiation such as x-rays, gamma rays, alpha particles and beta particles, the detector of the invention can be used to detect non-ionizing radiation from other parts of the electromagnetic spectrum and even to neutron detection. Ionizing radiation interacts directly with the gas in the cavity to directly produce charge carriers (or it may interact with detector materials to produce secondary electrons). If the radiation to be detected is non-ionizing, e.g. visible or UV light, then a thin layer 44 of a photoemitter material may be placed over plate 16, as shown in FIG. 3B (or on plate 14 or supports 18). Layer 44 is sufficiently thin that it does not change the reflective properties of plate 16. When non-ionizing radiation is incident on layer 44, layer 44 will emit photoelectrons that are then attracted to one of the plates and produce the desired effect. Similarly, to detect neutrons, layer 44 will be made of a neutron absorbing photoemissive material, e.g. a material containing boron or lithium such as plastic with boron nitride or polyethylene with lithium nitride. In this case, charged alpha particles will be produced. Thus the detector of the invention is broadly a radiation detector for all types of radiation, including non-ionizing radiation as well as ionizing radiation.

As described, one embodiment of the detector of the invention operates between two states, representing two positions of top plate 14 relative to bottom plate 16. In another embodiment of the invention, different integrated doses of radiation produce different amounts of total charge, which create different changes in the original electrostatic forces that allow the plate 14 to be in a continuum of positions, with corresponding color changes that reflect the total integrated radiation dose.

Figure 4:
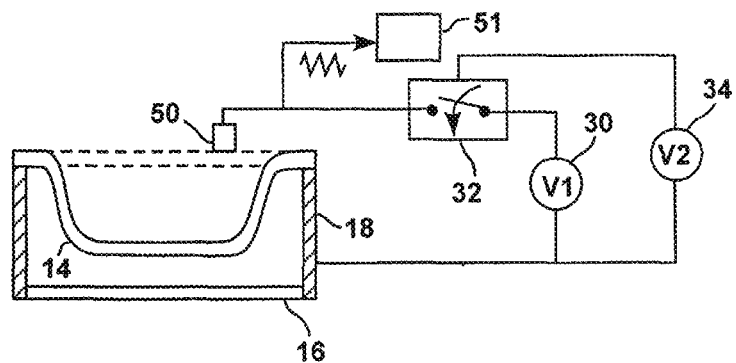
FIG. 4 is a cross-sectional view of an alternate embodiment of the radiation detector of FIGS. 1-2 with an alternate charging configuration.

FIG. 4 shows an optional contact 50 positioned so that when plate 14 returns to its first or open state (represented by the dashed lines), contact 50 will contact plate 14 and recharge plate 14, i.e. apply charging voltage from voltage source 30. In this embodiment, switch control voltage source 34 initially closes switch 32 which remains closed so that charging voltage source 30 remains connected to contact 50. As soon as the voltage from source 30 is applied to plate 14, plate 14 is attracted toward plate 16 (i.e. to its closed position as shown), thereby breaking contact with contact 50. When radiation 3o causes plate 14 to return to its original open position, plate 14 again makes contact with contact 50, becoming charged again, and the detector operation repeats. Each time that plate 14 contacts contact 50 and a voltage is applied, the voltage pulse may be counted by a register 51 connected to contact 50. Each detected pulse is the result of radiation having been detected, and the measured pulse rate is a measure of the radiation flux.

Figure 5:
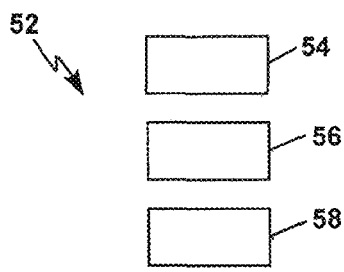
FIG. 5 is a top view of an array of radiation detectors of the invention.

An array 52 of individual detectors 54, 56, 58 is shown in FIG. 5. While three are shown, any number may be used. In one embodiment, all the individual detectors in the array are the same and small in size. A plurality of identical, small, individual detectors have been combined into an array to produce a sufficiently large array that can be easily observed so that the color variation indicating exposure to radiation can be recognized. Individual detectors may be designed for particular types of radiation, or for different levels of radiation, so that a more complete picture of the radiation environment may be provided. Each detector will produce a color change when it is impinged on by the particular type of radiation or the particular radiation level for which it is designed. The properties of each individual detector can be adjusted to suit the detection requirements for the type and level of radiation by adjusting the size and the materials used in its construction. The array would then be made up of subarrays of individual detectors, i.e. each detector 54, 56, 58 may in turn be formed of a subarray similar to array 52. Different subarrays would change color when certain types of radiation are encountered or as progressively higher doses or levels of radiation are encountered.

Figure 6:
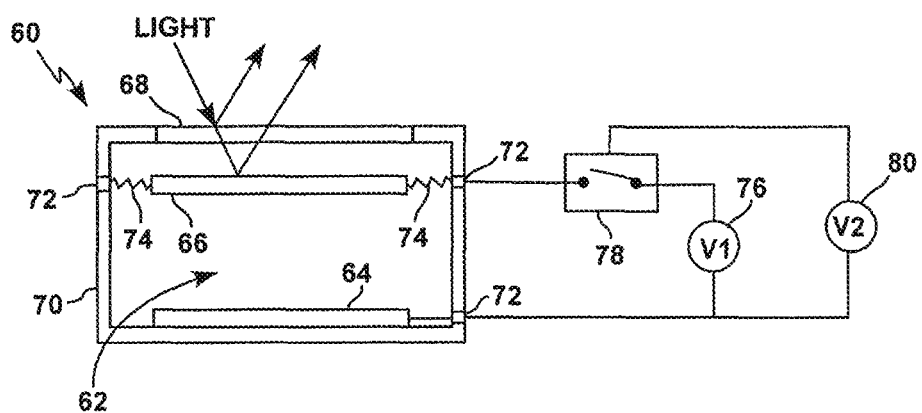
FIG. 6 is a cross-sectional view of a radiation detector of the invention having a deformable cavity with a large detector volume.

A larger detector 60 is shown in FIG. 6, where a large detection volume is provided by a chamber or cavity 62 formed between a bottom plate 64 and a first top plate 66 and the interferometer structure is formed between the first conductive top plate 66 having a mirrored top surface and a semireflective rigid second conductive top plate 68. The first top plate 66 is electrically insulated from the conductive exterior housing 70 by insulators 72 and is supported by springs 74. Plate 66 is charged to an electric potential by connecting a voltage source 76 via a switch 78 controlled by a switch control voltage source 80. Following the initial charging step the first top plate 66 is attracted to the second top plate 68 due to the electrostatic force between the two surfaces that are in close proximity from each other. The electrostatic force between the first top plate 66 and the bottom plate 64 is insignificant due to the large distance between the plates 66 and 64. Radiation produces charge carriers in the large chamber or cavity 62, and these charge carriers change the charge on first top plate 66. As the electrostatic force between the first and the second top plates 66, 68 changes due to radiation causing a decrease in the potential of the first top plate 66, the distance between the first and the second top plates 66, 68 changes, which causes a color change in the reflected light through the interferometer formed between the first and the second top plates 66, 68.

While the interferometric detectors 10 of FIGS. 1-2 are small and suitable for personal dosimetry, detector 60 can be large and is suitable for applications such as inside nuclear reactors. In such a harsh environment, visual readout using ambient light may not be possible. Different readout techniques can be used. Electrical contact readout such as shown in FIG. 4 may be used. Capacitive measurements could be used. A light source could be positioned to reflect a beam off the top surface of plate 66 to determine the position of plate 66.

The technology includes a method for detecting radiation by positioning a chamber formed between two conductive plates electrically insulated from each other and containing a gas to receive ionizing radiation or containing a vacuum with one of the plates having a photoemissive surface to receive nonionizing radiation. The top plate is formed of a conductive material with a semireflective surface. The bottom plate is formed of a conductive material with a mirrored surface. The top plate is flexible and the bottom plate is rigid, or vice versa. A charging voltage is applied across the plates. The charging voltage creates an electrostatic force between the plates which operates against the spring force of the flexible plate to draw the flexible plate toward the rigid plate to a position where the forces balance. An incident light beam is directed at the plates so that it is partly reflected from the top plate and partly transmitted therethrough to the bottom plate where it will be reflected. Charge carriers produced by ionizing radiation or by photoemissive material for non-ionizing radiation are attracted to the plates and change the electrostatic force so that the gap spacing between the plates changes. The change in position of the plates results in interference effects in the reflected beam that changes the color of the reflected beam, which may be visually observed or otherwise detected.

This technology also includes a method of detecting radiation by providing a chamber or cavity between a bottom plate and a first top plate. The chamber or cavity contains a gas (to detect ionizing radiation) or a vacuum and a surface formed of photoemissive material (to detect non-ionizing radiation). An interferometric structure is formed between the first top plate and a spaced second top plate. The first top plate is formed of a flexible conductive material and has a reflective top surface and is electrically insulated from the bottom plate and the second top plate. The second top plate is formed of a rigid conductive material and has a semireflective surface. The chamber or cavity is positioned to receive incident radiation which produces charge carriers. The first top plate is charged by a charging voltage source, and is attracted to the second top plate by electrostatic forces. When charge carriers are formed in the chamber or cavity by incident radiation, the charge carriers are attracted to the first top plate and change the electrostatic force between the first and second top plates, resulting in a change in the distance between the first and second top plates. This change is measured by any suitable technique and indicates the presence of radiation.

The invention thus provides a radiation detector for a wide spectrum of radiation that has an immediate color change visual readout. The detector is small and rugged. Since it does not include any electronic parts, but is made of a mechanical structure with a mechanical switch (the power supplies can be remote and connected by cables), the detector can be placed in a high radiation environment.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

All elements, parts and steps described herein are preferably included. It is to be understood that any of these elements, parts and steps may be replaced by other elements, parts and steps or deleted altogether as will be obvious to those skilled in the art.

In some depth, this writing presents the following. An apparatus and method for detecting radiation provides a visually observed change in color indicating exposure. The detector is based on an interferometric modulator in which a microelectromechanical structure (MEMS) is used to detect the radiation. In a basic embodiment, the structure has two electrically conductive plates electrically insulated and separated from each other by a micromechanical spring, and the space between the plates is filled with gas or contains a photoemissive surface. The plates are charged to different electric potentials, creating an electrostatic force between the plates, which pulls one plate closer to the other. The radiation interacts with the gas or photoemissive surface, producing electric charges, which change the electric potential on the plates, which causes a change in the electrostatic force and the distance between the plates. This change in distance between the plates can be detected optically as a result of interferometric effects. Ambient light incident on the two plates is reflected and constructively or destructively interferes, depending on the plate separation. This constructive or destructive interference results in an easily observable change in color of the reflected light. In an alternate embodiment, a similar interferometric modulator is positioned adjacent to a larger chamber in which incident radiation produces charge carriers that affect the position of the flexible plate.

CONCEPTS

This writing presents at least the following concepts.

Concept 1. A radiation detector, comprising:
a chamber or cavity that produces charge carriers when radiation is incident thereon;
a deformable plate along one side of the chamber or cavity;
a rigid plate spaced and electrically insulated from the deformable plate;
a charging voltage source for applying a voltage to the deformable plate;
wherein the deformable plate is attracted toward the rigid plate by electrostatic forces when charged by the charging voltage source, and moves away from the rigid plate when charge carriers produced in the chamber or cavity by incident radiation reduce the electrostatic forces between the deformable and rigid plates.

Concept 2. The radiation detector of Concept 1 wherein the deformable and rigid plates form an interferometric modulator.

Concept 3. The radiation detector of Concept 1 or 2 wherein the deformable and rigid plates are positioned adjacent to one side of the chamber or cavity with the deformable plate being the closest to the chamber or cavity.

Concept 4. The radiation detector of Concept 3 wherein the chamber or cavity is much larger than the volume between the deformable and rigid plates.

Concept 5. The radiation detector of Concept 4 further comprising a bottom plate positioned at the opposed side of the chamber or cavity from the deformable and rigid plates.

Concept 6. The radiation detector of Concept 5 further comprising a switch connecting the charging voltage source between the deformable plate and the bottom plate.

Concept 7. The radiation detector of Concept 1 or 2 wherein the chamber or cavity is between the deformable and rigid plates.

Concept 8. The radiation detector of Concept 1 or 2 further comprising a gas filling the chamber or cavity to produce charge carriers from ionizing radiation or a photoemissive surface in the chamber or cavity to produce charge carriers from non-ionizing radiation.

Concept 9. A radiation detector, comprising:
a conductive plate having a semireflective surface;
a conductive plate having a mirrored surface;
one of the plates being flexible and the other being rigid;
electrically insulating supports separating the flexible and rigid conducting plates, the plates and supports defining and enclosing a chamber therebetween;
a switch;
a charging voltage source connected across the plates by the switch;
wherein the flexible plate is attracted toward the rigid plate by an electrostatic force produced between the plates when the charging voltage source is connected across the plates, and charge carriers produced in the chamber by incident radiation are attracted to the plates and change the electrostatic force between the plates so that the flexible plate moves relative to the rigid plate, and ambient light reflected from the flexible and rigid plates interferes and produces observable color changes as the flexible plate moves relative to the rigid plate.

Concept 10. The radiation detector of Concept 9 further comprising a gas filling the chamber, the gas producing charge carriers when ionizing radiation is incident thereon.

Concept 11. The radiation detector of Concept 9 further comprising a vacuum in the chamber and a layer of photoemissive material formed on a surface in the chamber, the photoemissive material producing charge carriers when non-ionizing radiation is incident thereon.

Concept 12. The radiation detector of Concept 9, 10 or 11 further comprising a switch control voltage source connected to the switch.

Concept 13. The radiation detector of Concept 12 wherein the switch control voltage source comprises a pulsed voltage source for momentarily closing the switch.

Concept 14. The radiation detector of Concept 9, 10 or 11 further comprising an electrical contact connected to the switch and making contact with the flexible plate when the flexible plate is in a first or uncharged position, the charging voltage source being applied to the flexible plate through the electrical contact, the flexible plate breaking contact when the flexible plate is in a second or charged position, whereby the flexible plate is recharged by making contact with the electrical contact when radiation induced charge carriers cause the flexible plate to return to the first position from the second position.

Concept 15. The radiation detector of Concept 10 further comprising a much larger housing surrounding the chamber, and filled with the same gas.

Concept 16. The radiation detector of Concept 15 further comprising a plurality of perforations or apertures formed in the flexible plate.

Concept 17. A method of detecting radiation, comprising:
providing a chamber or cavity that produces charge carriers when radiation is incident thereon;
providing a deformable plate along one side of the chamber or cavity;
providing a rigid plate spaced and electrically insulated from the deformable plate;
applying a voltage to the deformable plate;
wherein the deformable plate is attracted toward the rigid plate by electrostatic forces when charged by the applied voltage, and moves away from the rigid plate when charge carriers produced in the chamber or cavity by incident radiation reduce the electrostatic forces between the deformable and rigid plates.

Concept 18. The method of Concept 17 further comprising positioning the deformable and rigid plates adjacent to one side of the chamber or cavity with the deformable plate being the closest to the chamber or cavity.

Concept 19. The method of Concept 18 further comprising forming the chamber or cavity with a much larger volume than between the deformable and rigid plates.

Concept 20. The method of Concept 17 further comprising forming the chamber or cavity between the deformable and rigid plates.

Concept 21. The method of Concept 17, 18, 19 or 20 further comprising filling the chamber or cavity with a gas to produce charge carriers from ionizing radiation.

Concept 22. The method of Concept 17, 18, 19 or 20 further comprising placing a photoemissive surface in the chamber or cavity to produce charge carriers from non-ionizing radiation.

What is claimed is:

1. A radiation detector, comprising:
a chamber or cavity that produces charge carriers when radiation is incident thereon;
a deformable plate along one side of the chamber or cavity;
a rigid plate spaced and electrically insulated from the deformable plate;
a charging voltage source for applying a voltage between the deformable plate and the rigid plate such that the deformable plate is attracted toward the rigid plate by electrostatic forces when charged by the charging voltage source, and moves away from the rigid plate when charge carriers produced in the chamber or cavity by incident radiation reduce the electrostatic forces between the deformable and rigid plates.

2. The radiation detector of claim 1 wherein the deformable and rigid plates form an interferometric modulator.

3. The radiation detector of claim 1 wherein the deformable and rigid plates are positioned adjacent to one side of the chamber or cavity with the deformable plate being the closest to the chamber or cavity.

4. The radiation detector of claim 3 wherein the chamber or cavity is much larger than the volume between the deformable and rigid plates.

5. The radiation detector of claim 4 further comprising a bottom plate positioned at the opposed side of the chamber or cavity from the deformable and rigid plates.

6. The radiation detector of claim 5 further comprising a switch connecting the charging voltage source between the deformable plate and the bottom plate.

7. The radiation detector of claim 1 wherein the chamber or cavity is between the deformable and rigid plates.

8. The radiation detector of claim 1 further comprising a gas filling the chamber or cavity to produce charge carriers from ionizing radiation or a photoemissive surface in the chamber or cavity to produce charge carriers from non-ionizing radiation.

9. The radiation detector of claim 8 wherein said photoemissive surface comprises a neutron absorbing photoemissive material.

10. The radiation detector of claim 1 wherein one of the deformable and rigid plates is a conductive plate having a semireflective surface; and the other of the deformable and rigid plates is a conductive plate having a mirrored surface.

11. The radiation detector of claim 1, wherein charge carriers produced in the chamber or cavity by different doses of incident radiation create different changes in the original electrostatic forces, thus moving the deformable plate to one position of a continuum of positions, said positions of said continuum of positions corresponding each to a received dose of incident radiation.

12. The radiation detector of claim 1 further comprising an electrical contact making contact with the deformable plate when the deformable plate is in a first or uncharged position, the charging voltage source being applied between the deformable plate and the rigid plate through the electrical contact, the deformable plate breaking contact when the deformable plate is in a second or charged position, whereby the deformable plate is recharged by making contact with the electrical contact when said charge carriers produced in the chamber or cavity by incident radiation cause the deformable plate to return to the first position from the second position; a register being connected to the electrical contact to count each return of the deformable plate to the first position.

13. A radiation detection device comprising a plurality of radiation detectors of claim 1 arranged into an array such that a deformation of the deformable plates of said radiation detectors is visually observable.

14. A radiation detector, comprising:
a conductive plate having a semireflective surface;
a conductive plate having a mirrored surface;
one of the plates being flexible and the other being rigid;
electrically insulating supports separating the flexible and rigid conducting plates, the plates and supports defining and enclosing a chamber therebetween;
a switch;
a charging voltage source connected across the plates by the switch;
wherein the flexible plate is attracted toward the rigid plate by an electrostatic force produced between the plates when the charging voltage source is connected across the plates, and charge carriers produced in the chamber by incident radiation are attracted to the plates and change the electrostatic force between the plates so that the flexible plate moves relative to the rigid plate, and ambient light reflected from the flexible and rigid plates interferes and produces observable color changes as the flexible plate moves relative to the rigid plate.

15. The radiation detector of claim 14 further comprising a gas filling the chamber, the gas producing charge carriers when ionizing radiation is incident thereon.

16. The radiation detector of claim 15 further comprising a much larger housing surrounding the chamber, and filled with the same gas.

17. The radiation detector of claim 16 further comprising a plurality of perforations or apertures formed in the flexible plate.

18. The radiation detector of claim 14 further comprising a vacuum in the chamber and a layer of photoemissive material formed on a surface in the chamber, the photoemissive material producing charge carriers when non-ionizing radiation is incident thereon.

19. The radiation detector of claim 18 wherein said photoemissive material comprises a neutron absorbing photoemissive material.

20. The radiation detector of claim 14 further comprising a switch control voltage source connected to the switch.

21. The radiation detector of claim 20 wherein the switch control voltage source comprises a pulsed voltage source for momentarily closing the switch.

22. The radiation detector of claim 14 further comprising an electrical contact connected to the switch and making contact with the flexible plate when the flexible plate is in a first or uncharged position, the charging voltage source being applied to the flexible plate through the electrical contact, the flexible plate breaking contact when the flexible plate is in a second or charged position, whereby the flexible plate is recharged by making contact with the electrical contact when radiation induced charge carriers cause the flexible plate to return to the first position from the second position.

23. The radiation detector of claim 14, wherein charge carriers produced in the chamber or cavity by different doses of incident radiation create different changes in the original electrostatic forces, thus moving the flexible plate to one position of a continuum of positions, said positions of said continuum of positions corresponding each to a color that reflects the received dose of incident radiation.

24. The radiation detector of claim 14, wherein said switch comprises an electrical contact making contact with the flexible plate when the flexible plate is in a first or uncharged position, the charging voltage source being applied between the flexible plate and the rigid plate through the electrical contact, the flexible plate breaking contact when the flexible plate is in a second or charged position, whereby the flexible plate is recharged by making contact with the electrical contact when said charge carriers produced in the chamber or cavity by incident radiation cause the flexible plate to return to the first position from the second position; a register being connected to the electrical contact to count each return of the flexible plate to the first position.

25. A radiation detection device comprising a plurality of radiation detectors of claim 14 arranged into an array such that a deformation of the deformable plates of said radiation detectors is visually observable.

26. A method of detecting radiation, comprising:
providing a chamber or cavity that produces charge carriers when radiation is incident thereon;
providing a deformable plate along one side of the chamber or cavity;
providing a rigid plate spaced and electrically insulated from the deformable plate;
applying a voltage between the deformable plate and the rigid plate such that the deformable plate is attracted toward the rigid plate by electrostatic forces when charged by the applied voltage, and moves away from the rigid plate when charge carriers produced in the chamber or cavity by incident radiation reduce the electrostatic forces between the deformable and rigid plates.

27. The method of claim 26 further comprising positioning the deformable and rigid plates adjacent to one side of the chamber or cavity with the deformable plate being the closest to the chamber or cavity.

28. The method of claim 27 further comprising forming the chamber or cavity with a much larger volume than between the deformable and rigid plates.

29. The method of claim 26 further comprising forming the chamber or cavity between the deformable and rigid plates.

30. The method of claim 26 further comprising filling the chamber or cavity with a gas to produce charge carriers from ionizing radiation.

31. The method of claim 26 further comprising placing a photoemissive surface in the chamber or cavity to produce charge carriers from non-ionizing radiation.

32. The method of claim 31 wherein said photoemissive surface comprises a neutron absorbing photoemissive material.

33. The method of claim 26 wherein one of the deformable and rigid plates is a conductive plate having a semireflective surface; and the other of the deformable and rigid plates is a conductive plate having a mirrored surface.

34. The method of claim 26, wherein charge carriers produced in the chamber or cavity by different doses of incident radiation create different changes in the original electrostatic forces, thus moving the deformable plate to one position of a continuum of positions, said positions of said continuum of positions corresponding each to a received dose of incident radiation.

35. The method of claim 26 further comprising:
providing an electrical contact that makes contact with the deformable plate when the deformable plate is in a first or uncharged position, said voltage being applied between the deformable plate and the rigid plate through the electrical contact, the flexible plate breaking contact when the deformable plate is in a second or charged position;
recharging the deformable plate by making again contact with the electrical contact when said charge carriers produced in the chamber or cavity by incident radiation cause the deformable plate to return to the first position from the second position; and
with a register connected to the electrical contact, counting each return of the deformable plate to the first position.

* * * * *